United States Patent [19]

Schulz

[11] Patent Number: 5,697,770
[45] Date of Patent: Dec. 16, 1997

[54] PUMP USING A SINGLE DIAPHRAGM HAVING PREFORMED OPPOSITELY DIRECTED BULGES FORMING INLET AND OUTLET VALVE CLOSING BODIES

[75] Inventor: Wolfgang Schulz, Bietigheim-Bissingen, Germany

[73] Assignee: Robert Bosch GmbH, Stuttgart, Germany

[21] Appl. No.: 751,799

[22] Filed: Nov. 18, 1996

Related U.S. Application Data

[63] Continuation of Ser. No. 576,383, Dec. 21, 1995.

[30] Foreign Application Priority Data

Dec. 23, 1994 [DE] Germany ............... 44 46 170.4

[51] Int. Cl.[6] ............... F04B 53/10; F04B 43/073; B60K 15/077; F16K 7/17
[52] U.S. Cl. ............... 417/560; 417/566; 137/512.4; 137/859
[58] Field of Search ............... 417/560, 566; 137/512.4, 859

[56] References Cited

U.S. PATENT DOCUMENTS

| | | | |
|---|---|---|---|
| 2,529,204 | 11/1950 | Van Ranst et al. | 417/560 X |
| 2,980,032 | 4/1961 | Schneider | 137/512.4 X |
| 3,058,140 | 10/1962 | Henss | 417/566 X |
| 4,181,477 | 1/1980 | Litt | 417/560 |
| 4,646,781 | 3/1987 | McIntyre et al. | 417/560 X |
| 4,712,583 | 12/1987 | Pelmulder et al. | 137/859 X |

FOREIGN PATENT DOCUMENTS

WO94/15090  7/1994  WIPO.

*Primary Examiner*—Richard E. Gluck
*Attorney, Agent, or Firm*—Edwin E. Greigg; Ronald E. Greigg

[57] ABSTRACT

A pumping device including a common pumping diaphragm with two stop valves each of which are equipped with a valve closing member that alternately assumes an open position and a closed position during the pumping operation. The pumping device according to the invention is provided for a fuel evaporation inhibiting system of an internal combustion engine.

6 Claims, 1 Drawing Sheet

PUMP USING A SINGLE DIAPHRAGM HAVING PREFORMED OPPOSITELY DIRECTED BULGES FORMING INLET AND OUTLET VALVE CLOSING BODIES

This is a continuation of copending application Ser. No. 08/576,383 filed on Dec. 21, 1995.

PRIOR ART

The invention set forth a stop valve arrangement for a pumping device, for a fuel evaporation inhibiting system of an internal combustion engine. There is already a known pumping device (WO 94/15090) which possesses two stop valves and a pumping diaphragm, for pumping air into a fuel tank for tightness testing. In this case, an air volume defined by the number of pumping movements of the pumping diaphragm is supplied to the fuel tank, in order to generate an overpressure in the fuel tank. After the pressure buildup has been concluded, the pressure behavior in the fuel tank makes it possible to conclude that, for example in the case of a constant pressure, there is tightness or, in the case of a pressure reduction, there is a leakage in the fuel tank, the time taken for the pressure reduction being a measure of the amount of leakage. Furthermore, the fuel evaporation inhibiting system comprises an adsorption filter connected to the fuel tank and a regenerating valve interposed between the adsorption filter and an intake pipe of the internal combustion engine.

In the prior art specified, the pumping diaphragm of the pumping device is loaded alternately with negative pressure and with ambient pressure. The negative pressure is extracted from an intake pipe of the internal combustion engine while the internal combustion engine is running and is supplied, via a switching valve designed, for example, in the form of an electromagnetic valve, to a pumping space limited by the switching valve and by the pumping diaphragm. In order to move the pumping diaphragm, negative pressure and ambient pressure are set alternately in the pumping space by switching the switching valve. When the pumping space is loaded with negative pressure, the pumping diaphragm moves upwards, for example counter to the pressure force of a pumping spring, whilst, in a feed space limited by the diaphragm and two stop valves and located opposite the pumping space, air flows out of a supply conduit into the feed space via an opened stop valve. When the pumping space is subsequently loaded with ambient pressure, the pumping diaphragm moves downwards again with the assistance of the pressure force of the pumping spring. During the downward-directed movement of the pumping diaphragm, both stop valves are in a closed position, until a specific overpressure is established in the feed space. When the overpressure is reached, a stop valve in a feed conduit opens in order to discharge the ambient air compressed in the feed space into a ventilating conduit of the adsorption filter by way of the feed conduit, thereby bringing about an increase in pressure in the fuel tank.

In the prior art specified, the mushroom-shaped stop valves each have a stem-like end which is inserted into an orifice for retention purposes. The stop valves have an elastic edge which serves as a valve closing body and which opens or closes a flow connection to the feed space. The arrangement of the stop valves is designed in such a way that the edge of one stop valve faces the pumping diaphragm and the edge of another stop valve faces away from the pumping diaphragm, in order to assume alternately an open position and a closed position, depending on the pressure in the feed space, so that air can be pumped out of the feed space into the feed conduit. However, the construction of individual stop valves of this type is complicated and, moreover, necessitates careful mounting during installation. Furthermore, stop valves of this type are relatively susceptible to faults, since the stop valve may come loose from the retention at particular pressures. Besides, only inaccurate opening and closing pressures can be brought about by means of these stop valves.

ADVANTAGES OF THE INVENTION

In contrast to this, the stop valve arrangement according to the invention for a pumping device, has the advantage of a simplified compact construction, the production costs of the pumping device being reduced as a result of a lower mounting outlay. Furthermore, the stop valve arrangement according to the invention is distinguished by increased operating reliability. Moreover, an accurate setting of the opening or closing pressure is possible as a result of the construction according to the invention of the stop valves.

Advantageous developments and improvements of the stop valve arrangement specified hereinafter are possible as a result of the measures listed herein.

BRIEF DESCRIPTION OF THE DRAWING

An exemplary embodiment of the invention is represented in simplified form in the drawing and is explained in more detail in the following description.

DETAILED DESCRIPTION OF THE EXEMPLARY EMBODIMENT

Figure 1:
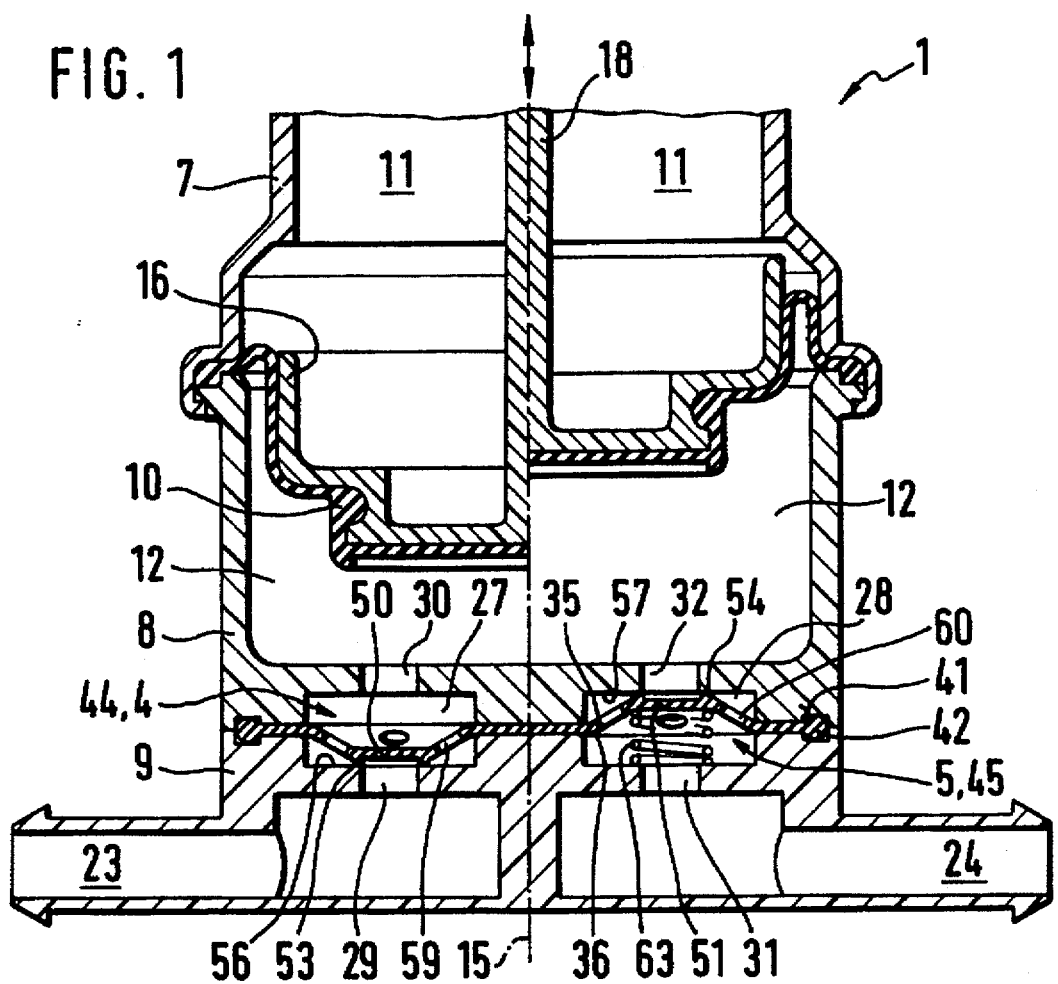
FIG. 1 shows a sectional representation of a pumping device equipped with stop valves according to the invention.

FIG. 1 partially represents a pumping device, designated by 1, which is equipped with stop valves 4, 5 designed according to the invention. The pumping device 1 has an upper housing portion 7, a middle housing portion 8 and a lower housing portion 9, which are produced, for example, from plastic and which are connected to one another by means of ultrasonic welding. The upper housing portion 7 overlaps the middle housing portion 8, so that a movable wall in the form of an elastic pumping diaphragm 10 can be clamped at its circumference between the upper housing portion 7 and the middle housing portion 8. The pumping diaphragm 10 separates a pumping space 11 from an opposite feed space 12. The feed space 12 is limited by the pumping diaphragm 10 on the one hand and by the two stop valves 4, 5 on the other hand, the stop valve 4 being represented in FIG. 1 on the left of a longitudinal axis 15 symmetrically dividing the pumping device 1 and the stop valve 5 on the right of the longitudinal axis 15. Attached to the side of the pumping diaphragm 10 facing away from the stop valves 4,5 is a spring plate 16 which has a tappet 18 which is oriented centrally relative to the longitudinal axis 15 and which is connected to the spring plate 16 or formed in one piece thereon. The tappet 18 serves for displacing the pumping diaphragm 10, which, in FIG. 1, is shown in its lowest position in the left-hand half and in its uppermost position in the right-hand half.

The stop valve 4, referred to below as a supply stop valve 4 and represented on the left of the longitudinal axis 15, closes or opens a flow connection which is connected from a supply conduit 23 via a lower orifice 29 to a cylindrical inner space 27 of the supply stop valve 4. Furthermore, the inner space 27 is connected via an upper orifice 30 to the feed space 12. The supply conduit 23 is connected to the environment, for example via an air filter not shown in more detail. The stop valve 5, referred to below as feed stop valve 5 and represented on the right of the longitudinal axis 15, closes or opens a flow connection which is connected from a feed conduit 24 via a lower orifice 31 to a cylindrical inner space 28 of the feed stop valve 5. Furthermore, the inner space 28 is connected via an upper orifice 32 to the feed space 12. The feed conduit 24 is connected, for example, to an adsorption filter, not shown in more detail, and to a fuel tank of an internal combustion engine.

The mode of operation of the pumping device 1 is described in more detail below. During the upward movement of the pumping diaphragm 10, the feed stop valve 5 is in a closed position and the supply stop valve 4 in an open position, with the result that air is pumped out of the environment, for example via an air filter not shown in more detail, into the feed space 12 by way of the supply conduit 23. During the subsequent downward movement of the pumping diaphragm 10, the supply stop valve 4 closes, so that the air enclosed in the feed space 12 is compressed. When a specific overpressure is reached, the feed stop valve 5 opens, in order to discharge the air compressed in the feed space into the feed conduit 24 and to bring about an increase in pressure in the fuel tank.

According to the invention, the supply stop valve 4 and the feed stop valve 5 possess a common valve body formed by a single valve diaphragm 40 which, for example, has a circular shape and consists of dimensionally stable plastic. The valve diaphragm 40 is clamped as an insertion part between the middle housing portion 8 and the lower housing portion 9 and also serves for sealing off the two housing halves 8 and 9. For fixing the valve diaphragm 40 in position, the latter has on its outer circumference a peripheral bead-like thickening 42 which serves as a seal and which can be received in an annular groove 41 cut out from the two housing portions 8, 9.

Figure 2:
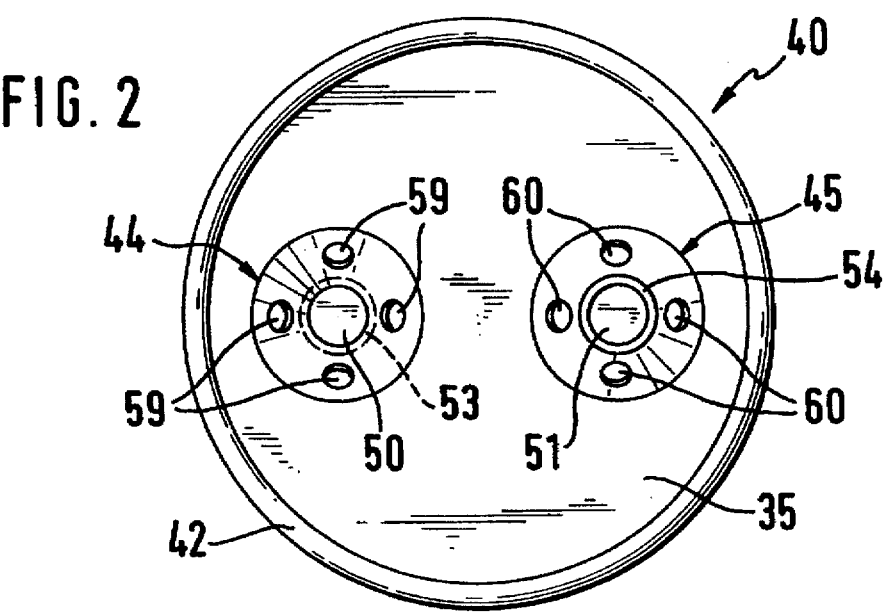
FIG. 2 shows a top view of a valve closing body of the stop valve arrangement.

The valve closing members of the supply stop valve 4 and of the feed stop valve 5 are formed at the same time on the valve diaphragm 40, for which purpose the valve diaphragm 40 has two bulges 44, 45 which are located in the inner space 27, 28. The bulge 44 forms the valve closing member of the supply stop valve 4 and is bulged convexly in the direction of the lower orifice 29 at a lower surface 36 of the valve diaphragm 40, the said lower surface facing away from the pumping diaphragm 10. The bulge 44 possesses a central part region 50 which is plane over a certain area and which has in the inner space 27 of the supply stop valve 4, on the lower surface 36, a peripheral bead 53 which, when the supply stop valve 4 is in the closed position, seals off the lower orifice 29 of the supply stop valve 4 by bearing on an inner surface 56 limiting the lower orifice 29. When the bead 53 is brought to bear, therefore there is, no flow connection from the supply conduit 23 to the feed space 12. As represented in FIG. 2, which is a top view of the valve diaphragm 40, the convex bulge 44 also possesses, for example, four perforations 59 which are arranged, for example, diametrically around the circular part region 50. The perforations 59 are necessary in order, in the open position of the supply stop valve 4, when the bead 53 is lifted off from the inner surface. 56, to obtain a flow connection from the supply conduit 23 to the feed space 12, the air passing via the lower orifice 29 to the inner space 27 of the supply stop valve 4 and from there via the perforations 59 of the valve diaphragm 40 to the upper orifice 30 and into the feed space 12.

The bulge 45 forms the valve closing member of the feed stop valve 5 and is bulged concavely in the direction of the upper orifice 32 at an upper surface 35 of the valve diaphragm 40, said upper surface facing the pumping diaphragm 10. The bulge 45 possesses a central part region 51 which is plane over a certain area and which has in the inner space 28 of the feed stop valve 5, on the upper surface 35, a peripheral bead 54 which, when the feed stop valve 5 is in the closed position, seals off the upper orifice 32 of the feed stop valve 5 by bearing on an inner surface 57 limiting the upper orifice 32. When the bead 54 is brought to bear, therefore, there is no flow connection from the feed space 12 to the feed conduit 24. As represented in FIG. 2, which is a top view of the valve diaphragm 40, the concave bulge 45 also possesses, for example, four perforations 60 which are arranged, for example, diametrically around the circular part region 51. The perforations 60 are necessary in order, in the open position of the feed stop valve 5, when the bead 54 is lifted off from the inner surface 57, to obtain a flow connection from the feed space 12 to the feed conduit 24, the air passing via the upper orifice 32 to the inner space 28 of the feed stop valve 5 and from their via the perforations 60 of the valve diaphragm 40 to the lower orifice 31 and into the feed conduit 24.

As a consequence of the shaping of the bulges 44, 45 and of the choice of the plastic and the design of the perforations 59, 60, it is possible to adapt the opening and closing pressure of the stop valve to the requirements. It is possible, furthermore, to equip the stop valves 4, 5 with compression springs which have an assisting effect on the valve closing body, in order, by means of a pressure force additionally exerted by the compression spring, to adapt the opening or closing pressure of the stop valves 4, 5 accordingly. As represented in the right-hand half of FIG. 1, in the exemplary embodiment only the feed stop valve 5 is equipped with the compression spring 63, which is accommodated in the inner space 28 between the lower surface 36 of the valve diaphragm 40 and the lower orifice 31. The compression spring 63 engages on the valve diaphragm 40, for example opposite the bead 54, and generates an increased pressure on the bead 54 by means of the spring force, thus resulting in an increase in the opening pressure of the stop valve 5.

The foregoing relates to preferred exemplary embodiments of the invention, it being understood that other variants and embodiments thereof are possible within the spirit and scope of the invention, the latter being defined by the appended claims.

I claim:

1. A stop valve arrangement for a pumping device of a fuel evaporation inhibiting system of an internal combustion engine, said pumping device comprising a supply conduit (23), a feed conduit (24), a feed space (12), a movable wall for pumping a compressible gaseous medium from said supply conduit via said feed space to said feed conduit and at least first and second stop valves, each of said first and second stop valves includes closing bodies, said closing bodies of the stop valves alternatively assume an open position and a closed position wherein the valve closing bodies of the at least first and second stop valves (4, 5) are formed on a common valve diaphragm (40), and the valve diaphragm (40) has durable preformed first and second stable bulges (44, 45) which serve as valve closing bodies each of which are bulged in opposite directions, said first bulge (44) of said valve diaphragm is directed toward said supply conduit (23) and said second bulge (45) of said valve diaphragm is directed toward said feed space (12).

2. The stop valve arrangement as claimed in claim 1, wherein the valve diaphragm (40) consists of dimensionally stable plastic.

3. The stop valve arrangement as claimed in claim 1, wherein the first and second bulges (44; 45) have respectively a plane central region (50; 51) which is limited by a circumferential bead (53; 54).

4. The stop valve arrangement as claimed in claim 3, wherein each of the first and second bulges (44; 45) has at least one perforation (59; 60) outside the central part region (50; 51).

5. The stop valve arrangement as claimed in claim 4, wherein four perforations (59; 60) are provided which are arranged diametrically opposite one another.

6. The stop valve arrangement as claimed in claim 1, wherein there is provided a compression spring (63) which acts on each of the first and second bulges (44; 45) in the closing direction of the stop valve (4; 5).

* * * * *